US008955053B2

(12) United States Patent
Chu et al.

(10) Patent No.: US 8,955,053 B2
(45) Date of Patent: Feb. 10, 2015

(54) METHOD FOR USING RIGHTS TO CONTENTS

(75) Inventors: Younsung Chu, Gyeonggi-Do (KR); Seungjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 453 days.

(21) Appl. No.: 12/881,083

(22) Filed: Sep. 13, 2010

(65) Prior Publication Data

US 2011/0072495 A1 Mar. 24, 2011

Related U.S. Application Data

(60) Provisional application No. 61/244,873, filed on Sep. 22, 2009, provisional application No. 61/251,280, filed on Oct. 13, 2009, provisional application No. 61/260,371, filed on Nov. 11, 2009.

(30) Foreign Application Priority Data

Feb. 5, 2010 (KR) .................... 10-2010-0011216

(51) Int. Cl.
*H04L 9/32* (2006.01)
*H04N 21/418* (2011.01)
*H04N 21/4627* (2011.01)

(52) U.S. Cl.
CPC ....... *H04N 21/4181* (2013.01); *H04N 21/4627* (2013.01)
USPC ...................... 726/4; 726/2; 726/26; 380/277

(58) Field of Classification Search
USPC ................ 726/2, 4, 7, 26; 713/168–170, 181; 380/277
See application file for complete search history.

(56) References Cited

U.S. PATENT DOCUMENTS

| 7,845,011 | B2 * | 11/2010 | Hirai ............................... 726/26 |
| 2004/0179691 | A1 * | 9/2004 | Hori et al. ..................... 380/277 |
| 2005/0182931 | A1 | 8/2005 | Robert et al. |
| 2005/0210279 | A1 | 9/2005 | Lee et al. |
| 2005/0216739 | A1 | 9/2005 | Lee et al. |
| 2005/0216763 | A1 | 9/2005 | Lee et al. |
| 2006/0010498 | A1 * | 1/2006 | Oh et al. ......................... 726/26 |
| 2006/0059094 | A1 | 3/2006 | Oh et al. |
| 2006/0129814 | A1 * | 6/2006 | Eun et al. ....................... 713/168 |
| 2007/0157318 | A1 * | 7/2007 | Lee et al. ........................ 726/27 |
| 2008/0154782 | A1 | 6/2008 | Kang et al. |
| 2011/0119494 | A1 * | 5/2011 | Huang et al. ................... 713/182 |

FOREIGN PATENT DOCUMENTS

| CN | 101094062 A | 12/2007 |
| CN | 101206696 A | 6/2008 |
| KR | 10-2005-0096040 A | 10/2005 |
| KR | 10-2006-0024955 A | 3/2006 |
| KR | 10-2006-0082807 A | 7/2006 |

* cited by examiner

*Primary Examiner* — Saleh Najjar
*Assistant Examiner* — Peiliang Pan
(74) *Attorney, Agent, or Firm* — Birch, Stewart, Kolasch & Birch, LLP

(57) ABSTRACT

Disclosed herein is a method of checking whether or not a memory card including rights to contents is mounted in a terminal during a process of using the contents. The checking operation may be performed in synchronization with a timing at which a BCAST client within the terminal requests a traffic encryption key (TEK) to a DRM agent. In addition, there is disclosed herein a method of checking whether or not the memory card is mounted therein, as well as whether or not rights to the contents actually exist in the memory card.

16 Claims, 11 Drawing Sheets

US 8,955,053 B2

METHOD FOR USING RIGHTS TO CONTENTS

RELATED APPLICATION

Pursuant to 35 U.S.C. §119(a), this application claims the benefit of U.S. Provisional Application Nos. 61/244,873 filed on Sep. 22, 2009, 61/251,280 filed on Oct. 13, 2009, 61/260,371 filed on Nov. 11, 2009 and Korean Application No. 10-2010-0011216, filed on Feb. 5, 2010, the contents of which is incorporated by reference herein in its entirety.

BACKGROUND OF THE INVENTION

1. Field of the Invention

The present invention relates to a digital rights management method, and more particularly, to a method for safely issuing a rights object to a memory card in digital rights management (DRM).

2. Description of the Related Art

Digital Rights Management (DRM), as a system technology for safely protecting and systematically managing rights to digital contents, provides a series of protection and management system for the process of protecting an illegal copy of contents, acquiring a rights object (RO) of DRM contents, and producing, distributing and using DRM contents.

FIG. 1 is a view illustrating a general configuration of a DRM system.

A typical DRM system manages digital contents transferred from a contents provider to a user to be used only as much as the rights object allowed to the user. At this time, the contents provider is an entity corresponding to a content issuer (CI) 30 and/or a rights issuer (RI) 40.

The content issuer (CI) 30 issues contents (hereinafter, referred to as "DRM contents" or "digital contents") protected by using a specific encryption key to protect contents from a user having no access authority, and the rights issuer (RI) 40 issues a rights object required for using the DRM contents.

The terminal 10 includes a DRM agent, and the DRM agent receives DRM contents from the content issuer (CI) 30, and receives a rights object for the contents from the rights issuer (RI) 40, and interprets permission and/or constraints included in the rights object (RO), thereby managing the use of the DRM contents in the relevant terminal.

Typically, a right object is encrypted by a public key of a specific terminal, and thus other terminals except a terminal having a private key that makes a pair with the public key are unable to decrypt or use DRM contents related to the rights object.

FIG. 2 illustrates an example in which a DRM technology in the related art is applied to broadcast services.

Referring to FIG. 2, it is illustrated an example in which a DRM technology in the related art is applied to broadcast services, namely, BCAST services.

A broadcast server 50 transmits a traffic encryption key (TEK) encrypted with a service encryption key (SEK) or program encryption key (PEK) to the rights issuer (RI) 40, and transfers broadcast contents encrypted with the TEK to a first terminal 11.

The rights issuer (RI) 40 provides rights including the SEK or PEK, and the encrypted TEK to the first terminal 11.

The terminal 11 stores rights received from the rights issuer (RI) 40 in a detachable memory 15. Furthermore, the terminal 11 copies the rights in the memory 15 into the terminal 11, and then decrypts the TEK included in the rights. Furthermore, the terminal 11 consumes contents transferred from the broadcast server 50 using the decrypted TEK.

In the related art as described above, a second terminal 12 is also able to receive the broadcast contents; however, if the second terminal 12 does not have rights including the TEK, then the second terminal 12 is not allowed to consume the broadcast contents, thereby protecting the contents.

However, in the related art as illustrated above, the rights in the memory 15 are copied into the terminal 11, and then contents are consumed by using the rights. Accordingly, if the rights that have been existed in the memory are copied into the terminal 11 and then the memory 15 is mounted in the second terminal 12, then a problem may be caused in that the broadcast contents can be used through the second terminal 12.

Such a problem may be more aggravated if they are broadcast contents having a long play time such as film or drama. In other words, the memory 15 may be shared by a plurality of terminals without a sense of responsibility, thereby causing a problem that the broadcast contents can be consumed without permission.

SUMMARY OF THE INVENTION

Accordingly, the objective of the present invention is to solve the foregoing problems.

Specifically, an object of the present invention is to allow a terminal to use contents only when a memory card including rights is mounted in the terminal. In addition, another object of the present invention is to check whether or not there exist rights of the contents within the memory card while the contents being used by the terminal.

In order to accomplish the foregoing objective, there is disclosed herein a method of checking whether or not a memory card including rights to contents is mounted in a terminal during a process of using the contents. The checking operation may be performed in synchronization with a timing at which a BCAST client within the terminal requests a traffic encryption key (TEK) to a DRM agent.

In addition, there is disclosed herein a method of checking whether or not the memory card is mounted therein, as well as whether or not rights to the contents actually exist in the memory card.

Specifically, in order to accomplish the foregoing objective, according to the present invention, there is provided a method of using rights to broadcast contents in a terminal The method of using rights to broadcast contents in a terminal may include checking whether or not rights corresponding to broadcast contents include a constraint for verifying an existence of a memory card; transmitting a request message for verifying an existence of the rights (or rights information) to the memory card if the rights include the constraint; receiving a response message from the memory card; determining whether or not there exist the rights (or the rights information) within the memory card in response to the response message; and stopping or not initiating a consumption of the rights corresponding to the broadcast contents according to the existence or non-existence of the rights (or the rights information).

The request message may be transmitted according to the request of a traffic encryption key (TEK).

The constraint (or restriction) may be a SRMPing element. The constraint (or restriction) may include at least one of a synchronized element indicating that the verification of the existence of the rights (or the rights information) should be performed in synchronization with a TEK request, a syncThreshold element indicating that the verification of the existence of the rights (or the rights information) should be performed when the reception of the TEK request exceeds a predetermined threshold value, and an Interval element indicating that the verification of the existence of the rights (or the rights information) should be performed for each predetermined duration.

The transmitting step of the request message may include receiving, by a DRM agent within the terminal a TEK request message from a BCAST client within the terminal; and transmitting the request message in response to the reception of the TEK request message.

The transmitting step of the request message may include determining, by a DRM agent within the terminal, whether or not the number of the received TEK request messages from a BCAST client exceeds a threshold value indicated within the constraint (or restriction); and transmitting the request message when exceeding the threshold value.

The transmitting step of the request message may include checking whether or not it reaches a predetermined duration indicated in the constraint (or restriction); and transmitting the request message when reaching the duration.

If there is no information about whether or not it should be performed for each predetermined duration in the constraint (or restriction), then that the verification of the existence should be performed in synchronization with a TEK request Information within the rights may be a rights object encryption key (REK).

The request message may include identification information to the rights and a random value.

The response message may include a hash value, and the hash value may be obtained for at least one of the random value and predetermined information within the rights.

The determining step include obtaining a hash value for at least one of the random value and the information within the rights stored in the terminal; and comparing the obtained hash value with the hash value within the response message.

It may be determined that there exists the rights (or the rights information) within the memory card if the hash values are identical to each other, and there do not exist the rights (or the rights information) within the memory card if hash values are not identical to each other or there does not exist the hash value within the rights existence check response message. The identification information may be Handle.

On the other hand, in order to accomplish the foregoing object, according to the present invention, there is provided a method of providing rights for broadcast contents from a memory card to a terminal. The method of providing rights may include providing, by the memory card, rights corresponding to the broadcast contents to the terminal, wherein the rights information includes a constraint for verifying an existence of the rights (or the rights information); deactivating, by the memory card, the rights; receiving, by the memory card, a request message for verifying the existence of the rights (or the rights information) from the terminal, wherein the request message comprises identification information to the rights (or the rights information) and a random value; checking, by the memory card, whether or not there exist the rights (or the rights information); generating, by the memory card, a hash value for at least one of the random value and predetermined information within the rights (or the rights information) if there exist the rights (or the rights information); and transmitting a response message including the hash value to the terminal.

The present invention is provided to solve the foregoing problem. In other words, the present invention is provided to prevent rights from being copied without a sense of responsibility, thereby allowing contents to be safely used.

In addition, according to the present invention, it may be possible to check whether a memory card is mounted therein as well as whether there exist rights within the memory card while using broadcast contents, thereby preventing the contents from being used without permission.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
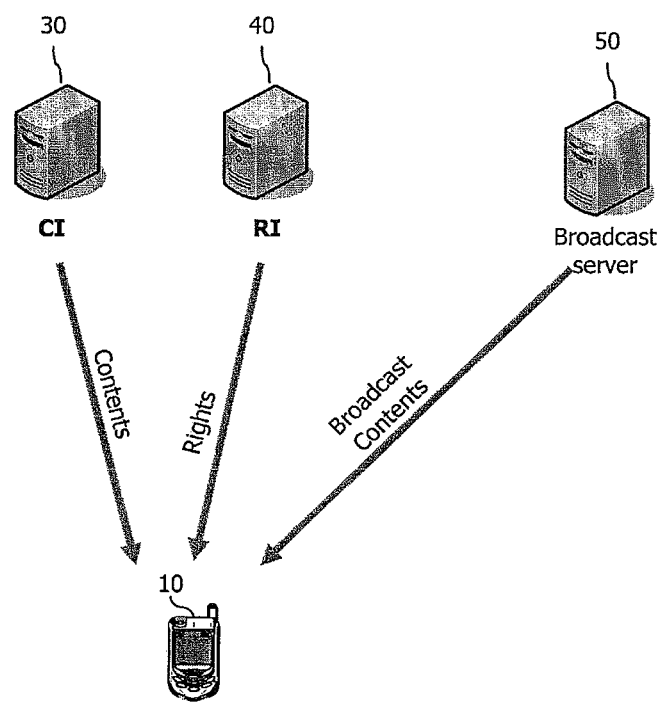
FIG. 1 is a view illustrating a general configuration of a DRM system.
Figure 2:
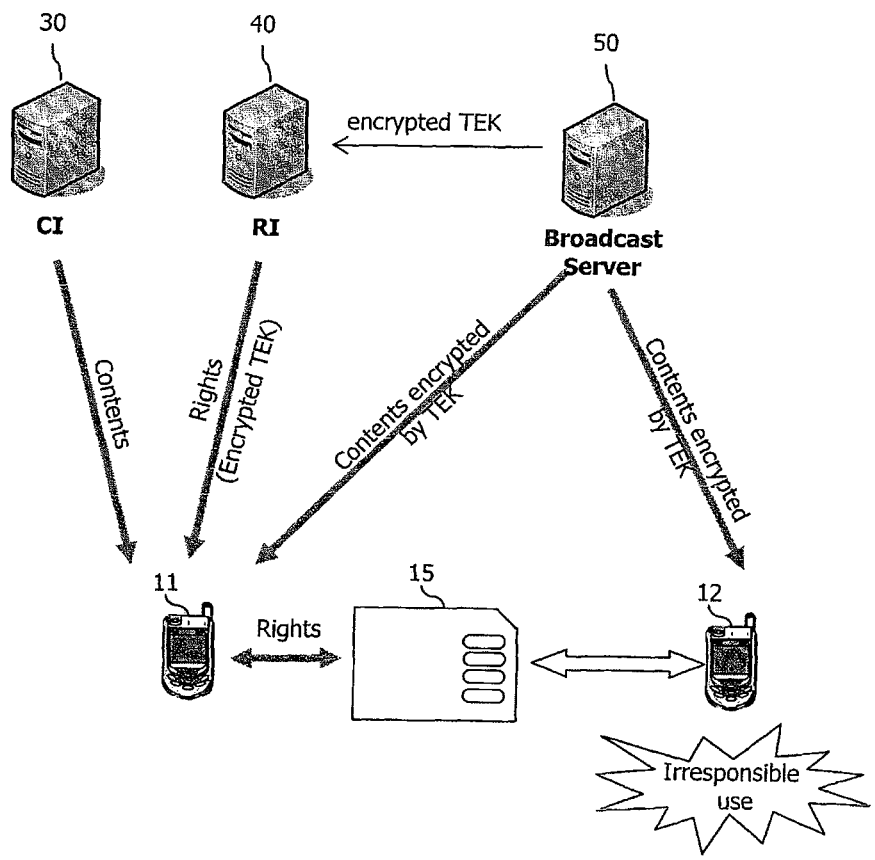
FIG. 2 illustrates an example in which a DRM technology in the related art is applied to broadcast services.

The present invention will be applicable to a digital rights management (DRM) system. However, the present invention will not be limited to the foregoing system, but may be applicable to all communication systems and methods to which the technical spirit of the invention is applied, and other digital rights management related systems and methods.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, the terms used herein including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

In case where an element is "connected" or "linked" to the other element, the element may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Hereinafter, the term "device" is used as illustrated in FIGS. 3 through 7, but the device may be also called a user equipment (UE), a mobile equipment (ME), and a mobile station (MS). Furthermore, the device may be portable equipment such as a portable phone, a PDA, a smart phone, and a notebook, or non-portable equipment such as a PC, and a vehicle-loaded device.

Definition of Terms

Hereinafter, the terms used in this specification will be briefly defined prior to describing with reference to the drawings.

1) DRM Agent: As an entity existing within a terminal, the DRM agent manages the permission to a media object.

2) Media Object: Denotes a digital work (or operation), for instance, the operation to telephone bell, screen saver, Java game or a combination thereof.

3) DRM Content: Denotes a media object consumed according to the permission within a rights object.

4) Broadcast Rights: also referred to as BCAST rights. Used for BCAST services.

5) Rights Issuer (RI): Denotes an entity for issuing a rights object to DRM contents.

6) Permission: Permission to actually use DRM contents allowed by a rights issuer (RI).

7) Rights: Denotes a permission and constraint (or restriction) given to DRM contents. The rights is included in a rights object along with information about the related state thereof and other information. The rights=rights information+rights object encryption key (REK)

8) Rights Object: The rights object is also referred to as rights, including a permission (or constraint (or restriction)) to DRM contents and other attributes connect to the contents. The rights object may be typically stored in a terminal, but may be also stored in a memory card, for instance, SRM, according to an embodiment of the present invention. At this time, the rights object may be stored in the form of a rights object container. An agent of the SRM manages the rights object container as an opaque object. In other words, the SRM agent does not parse the rights object container. The rights=part of rights information (state information is not included but other values are all included)+rights object encryption key (REK)

9) Rights Information: The rights information includes rights meta data, a rights object container, and the state information. Rights information=(rights object−rights object encryption key (REK)+state information+state information=rights−rights object encryption key (REK)

10) Rights Meta Data: The rights meta data includes a rights object version, a rights object (RO) alias, a rights issuer (RI) identifier, a rights issuer (RI) URL, a rights issuer (RI) alias, and a rights issuer (RI) time stamp.

11) State Information: The state information denotes a current state of each stateful permission within stateful use rights (for instance, remaining count, interval start date, etc.). If the use rights are stateful use rights, then the state information is included in rights.

12) Asset ID: As an abbreviation of "asset identifier", and is included in a rights object (RO), and used to identify DRM contents.

13) REK: The REK is a rights object encryption key, having a binary form with no base64 encoding.

14) Handle: As a random number generated by a DRM agent, the Handle is used to allow the DRM agent to identify use rights (or rights object (RO) or rights information) stored in a memory card, for instance, SRM. The Handle is used to identify use rights (or rights object (RO)) when the Handle is accessed by the DRM agent in order to use or move the use rights within the SRM. The Handle is stored in the SRM, or stored in an operation log of a terminal. The DRM agent generates the Handle, and transmits the generated Handle to the SRM when transmitting a message for using or moving the use rights (or rights object (RO)).

15) Secure Authenticated Channel (SAC): Denotes a logical channel for securing the integrity and reliability of transmitted or received messages.

16) MAKE: is an abbreviation of "Mutual Authentication and Key Exchange." A SAC context required for configuring the SAC may be generated through the MAKE procedure. Specifically, a negotiation is performed between the DRM agent and the SRM agent for trust model, entity ID, security algorithm, and the like, and a mutual recognition procedure is carried out in the MAKE procedure. The information of an encryption key (session key, MAC key) to be used in SAC is exchanged in the MAKE procedure. The MAKE procedure will be described in detail later with reference to FIG. 5.

17) MAC Key: Denotes a key used for securing the integrity in a SAC session between the DRM agent and the SRM agent.

18) Session Key: Denotes an encryption key used for securing the reliability in a SAC session between the DRM agent and the SRM agent.

19) Entity ID: is a SRM ID for a terminal and an ID of the terminal for SRM.

20) SAC Context: The SAC context includes information required for configuring the SAC as illustrated in Table 1. The SAC context is maintained until a new SAC is generated between the DRM agent and the SRM agent.

TABLE 1

| Name | Description |
| --- | --- |
| MAC Key | A key used for securing the integrity in a SAC session between the DRM agent and the SRM agent. |
| Session Key | An encryption key used for securing the reliability in a SAC session between the DRM agent and the SRM agent. |
| Selected Algorithms | Algorithms negotiated through a MAKE procedure. |
| Trust Anchor | A trust anchor configured in SAC. |
| Entity ID | Indicates an ID of SRM for the DRM agent, and indicates an ID of DRM for the SRM agent. |

21) Protected Rights Object (RO): The protected rights object (RO) is a form based on DRM version 2.0. The protected RO is a format used when providing from the RI to a terminal. Also, the protected RO is a format used when transferring from the DRM agent of the terminal to the memory card, for instance, the SRM agent of the SRM. The protected rights object (RO) includes a series of rights objects, i.e., a <RO> element and a <mac> element including a MAC value as illustrated in the following table. The <mac> element is used to check the integrity of the <ro> element and key.

TABLE 2

```
<element name="protectedRO" type="roap:ProtectedRO"
form="qualified"/>
<complexType name="ProtectedRO">
  <sequence>
    <element name="ro" type="roap:ROPayload" form="qualified"/>
    <element name="mac" type="ds:SignatureType"/>
  </sequence>
</complexType>
```

As illustrated in the above table, the <ro> element includes ROPayload item. The ROPayload item includes protected rights and wrapped keys. The wrapped keys are used to decrypt an portion encrypted within the rights. The ROPayload item includes the content as illustrated in the following table.

TABLE 3

```
<!-- Rights Object Definitions -->
<complexType name="ROPayload">
  <sequence>
    <element name="riID" type="roap:Identifier"/>
    <element name="rights" type="o-ex:rightsType"/>
    <element name="signature" type="ds:SignatureType"
      minOccurs="0"/>
    <element name="timeStamp" type="dateTime" minOccurs="0"/>
    <element name="encKey" type="xenc:EncryptedKeyType"/>
    <element ref="roap:roPayloadAliases" minOccurs="0"/>
    <any processContents="lax" minOccurs="0"
      maxOccurs="unbounded"/>
  </sequence>
  <attribute name="version" type="roap:Version" use="required" />
  <attribute name="id" type="ID" use="required" />
  <attribute name="stateful" type="boolean"/>
  <attribute name="domainRO" type="boolean"/>
  <attribute name="riURL" type="anyURI"/>
</complexType>
```

The <riID> element includes an identifier for identifying an rights object issuer.

A value of the <timestamp> element is given as Universal Coordinated Time (UTC) used to prevent hacking or cracking through retransmission.

The <Signature> element includes a signature of the rights object issuer.

The <encKey> element includes a MAC key, $K_{MAC}$, REK (RO encryption key), and KREK.

On the other hand, a <roPayloadAliases> element as illustrated in the following table is included in the ROPayload.

TABLE 4

```
<element name="roPayloadAliases">
  <complexType>
    <sequence>
      <element name="roAlias" type="roap:String80"
        minOccurs="0"/>
      <element name="domainAlias" type="roap:String80"
        minOccurs="0"/>
      <element name="riAlias" type="roap:String80"/>
      <any processContents="lax" minOccurs="0"
        maxOccurs="unbounded"/>
    </sequence>
  </complexType>
</element>
```

On the other hand, a Nonce item includes a random value within a ROAP protocol message. The Nonce item should be used only once as indicated by the name. In other words, a random value of the Nonce is generated whenever the ROAP message is generated.

TABLE 5

```
<simpleType name="Nonce">
  <restriction base="base64Binary">
    <minLength value="14"/>
  </restriction>
</simpleType>
```

Description for the Concept of a Method Proposed in this Specification

In the present invention, during a process of using contents, whether or not a memory card including rights to the contents, i.e., Secure Removable Media (SRM), is mounted in a terminal is checked. In addition, according to the present invention, during a process of using the contents, whether there actually exist rights to the contents within the SRM as well as whether the SRM is mounted therein is checked.

For the check, according to the present invention, a rights existence check protocol is disclosed herein. The rights existence check protocol may be, illustratively, a SRM Ping protocol.

Hereinafter, an embodiment according to the present invention will be described in detail with reference to the accompanying drawings.

Figure 3:
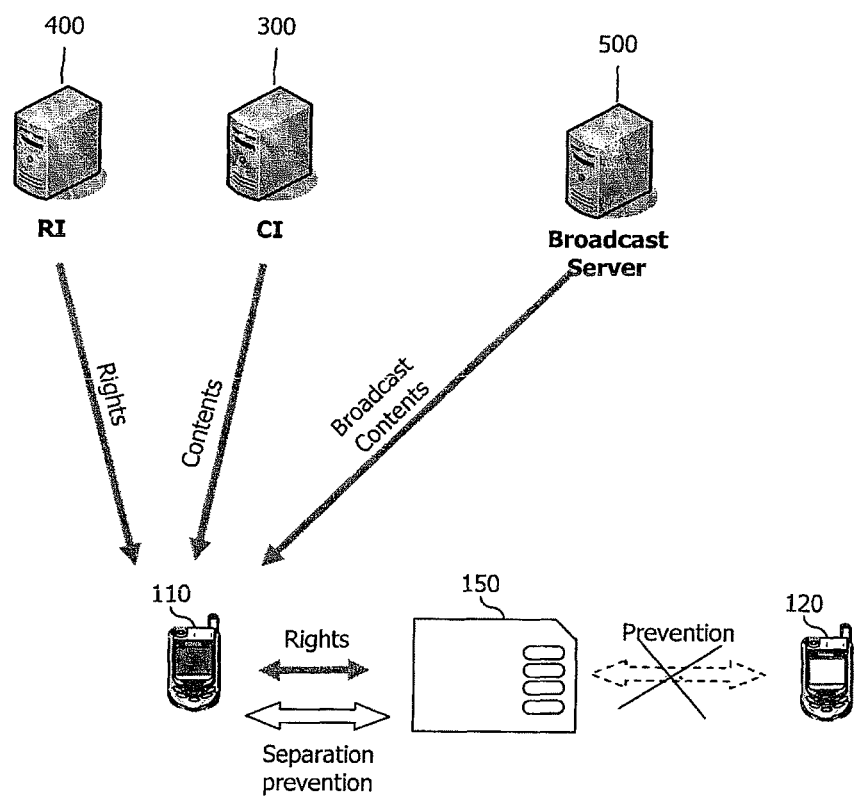
FIG. 3 illustrates a concept in which contents and a rights object according to the present invention are issued to a memory card.

FIG. 3 illustrates a concept in which contents and a rights object according to the present invention are issued to a memory card.

The first and second terminals 110, 120 include DRM agents, respectively. Furthermore, the SRM 150 includes a SRM agent.

Referring to FIG. 3, a content issuer (CI) 300 issues contents to a first terminal 110.

Then, the broadcast server 500 transmits a traffic encryption key (TEK) encrypted with a service encryption key (SEK) or program encryption key (PEK) to the rights issuer (RI) 400, and transfers the broadcast contents encrypted with the TEK to a terminal 110.

The rights issuer (RI) 400 provides rights including the SEK or PEK, and the encrypted TEK to the first terminal 110. At this time, the rights (or RO) are issued in the name of the memory card, namely, SRM 150.

The first terminal 110 stores rights received from the rights issuer (RI) 400 in a memory, namely, SRM 150. Furthermore, the terminal 110 copies the rights within the memory 150 into the terminal 110, and then decrypts the TEK included in the rights. Furthermore, the terminal 110 consumes contents transferred from the broadcast server 500 using the decrypted TEK.

In case where the first terminal 110 uses the broadcast contents, between the SRM 150 and the SRM agent whether or not a memory card stored with the rights, i.e., Secure Removable Media (SRM), is mounted therein is checked. In addition, according to the present invention, during a process of using the contents, whether there actually exist rights to the contents within the SRM as well as whether the SRM is mounted therein is checked.

Hereinafter, referring to FIGS. 4 through 8, preferred embodiments of the present invention will be described.

Figure 4:
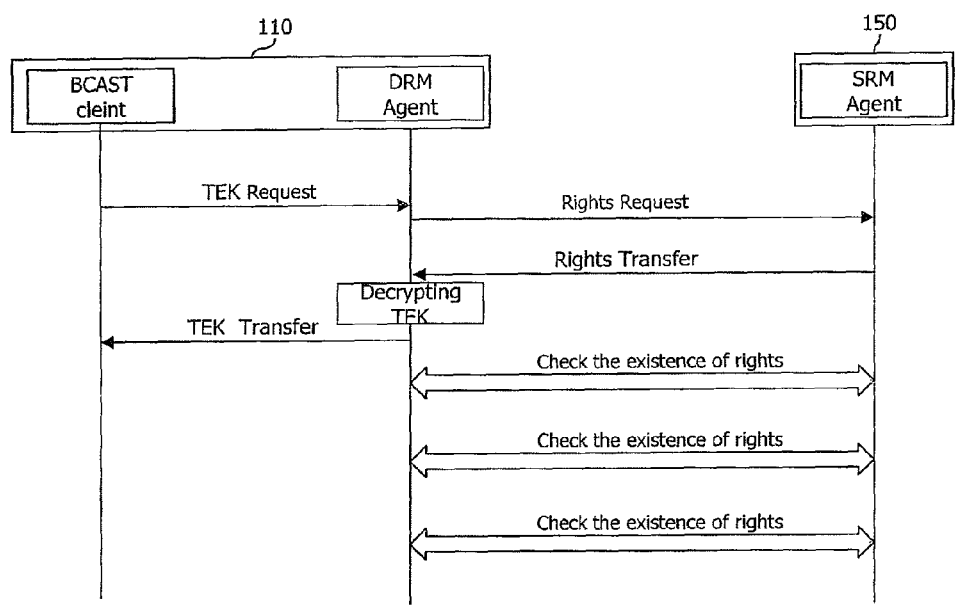
FIG. 4 is an exemplary flow chart illustrating a concept according to the present invention.

FIG. 4 is an exemplary flow chart illustrating a concept according to the present invention.

Referring to FIG. 4, the first terminal 110 includes a broadcast client (BCAST client) and a DRM agent. The first terminal 110 is mounted with a memory card, namely, SRM 150. The SRM 150 includes a SRM agent.

If broadcast contents should be used according to a request of the user of the first terminal 110 or a request of other applications, the BCAST client requests TEK to the DRM agent.

Then, the DRM agent requests rights (or RO) to the SRM agent 150 to obtain the TEK. The SRM agent provides rights within the SRM to the DRM agent.

The DRM agent temporarily stores the received rights, and decrypts the TEK within the rights. Then, the DRM agent transfers the TEK to the BCAST client.

The BCAST client consumes contents broadcasted from the broadcast server 500 using the TEK.

While consuming the broadcast contents, between the DRM agent and the SRM agent whether or not a memory card stored with the rights, namely, Secure Removable Media (SRM), is mounted therein is checked. In other words, as shown in the drawing, a rights existence check protocol is carried out.

At this time, if whether or not the SRM is mounted in the terminal is checked, a security issue may be caused as follows. For example, even in case where the SRM agent does not include rights for BCAST services for any reason, the SRM is still mounted in the terminal, and therefore, the DRM agent decrypts TEK using SEK and PEK within the temporarily stored rights to provide to the BCAST client. Thus, it is a serious security error when the BCAST client consumes broadcast contents. For another example, in case where another application installed within the terminal informs the DRM agent that the SRM is correctly mounted therein, there is a problem that the DRM agent determines no error has occurred, and decrypts the TEK to provide to the BCAST client. Thus, viewing of BCAST services is continuously enabled even without mounting the memory card, i.e., SRM, in the terminal.

As a result, the rights existence check protocol according to the present invention allows the SRM to check whether there actually exist rights to the contents actually within the SRM as well as whether the SRM is mounted in the terminal.

The rights existence check protocol may include, illustratively, a SRM Ping request message and a SRM Ping response message.

The SRM Ping request message is a message transmitted from the DRM agent to the SRM agent. The SRM Ping request message includes Handle for rights stored within the SRM. The SRM Ping request message may include a specific value, for instance, a random value, to prevent replay attack. The replay attack refers to a behavior of tricking the DRM agent into believing that there exist rights within the SRM by transmitting a previously manipulated SRM Ping response message to the DRM agent.

If the SRM agent receives the SRM Ping request message, then whether or not rights corresponding to Handle included within the SRM Ping request message are stored therein is checked. Then, if there exist the rights, then the SRM agent generates REK within the rights corresponding to the Handle and a hash to the random value, allowing the hash to be included in the SRM Ping response message to transmit to the DRM agent. The DRM agent can check that there exist rights within the SRM as well as that the SRM is mounted therein. As a result, it may be possible to prevent contents from being illegally used by mounting vacant SRM in the terminal.

On the other hand, according to the present invention, the SRM Ping request message may be transmitted to the SRM in synchronization with a request of TEK by the BCAST client, or with a predetermined duration. Also, the SRM Ping request message may be transmitted whenever exceeding a predetermined threshold value. The predetermined threshold value may be specified for the request of TEK.

The information on the execution of the existence check protocol may be included within the rights. In other words, a constraint (or restriction) related to the execution of the SRM Ping protocol may be included within the rights. The constraint (or restriction) related to the SRM Ping protocol may be a <srmPing> element included in the rights. The <srmPing> element may be located at a lower level of the <constraint> element located at a lower level of the <rights> element within the rights object.

The <srmPing> element may be illustrated as follows.

TABLE 6

```
<xsd:element name="srmPing" substitutionGroup="o-ex:constraintElement">
    <xsd:complexType>
        <xsd:complexContent>
            <xsd:extension base="xsd:constraintType">
                <xsd:choice minOccurs="0">
                    <xsd:element name="synchronised" type="xsd:boolean" default="true"/>
                    <xsd:element name="syncThreshold" type="xsd:count "/>
                    <xsd:element name="checkInterval" type="xsd:duration"/>
                </xsd:choice>
                <xsd:any minOccurs="0" maxOccurs="unbounded" processContents="lax"/>
            </xsd:extension>
        </xsd:simpleContent>
    </xsd:complexType>
</xsd:element>
```

If the <srmPing> element is included in the rights, then the DRM agent should perform a SRM Ping protocol. The <srmPing> element may include any one of a <synchronized> sub-element, a <syncThreshold> sub-element, and a <checkInterval> sub-element. The call or non-call of the SRM Ping protocol is determined by the sub-element. If there does not exist the sub-element at a lower level of the <srmPing> element, then the DRM agent is interpreted as including a <synchronized> sub-element. In other words, if a <checkInterval> sub-element is included within the <srmPing> element, then it is operated according to the <checkInterval> sub-element. However, if the <checkInterval> sub-element is not included therein, then a SRM Ping protocol is carried out prior to performing a Short Term Key Message (STKM) procedure. For example, if the <checkInterval> sub-element is not included therein, it may be carried out in synchronization with a request of TEK.

The <synchronized> sub-element indicates whether or not a SRM Ping protocol is synchronized with a BCAST client. The SRM Ping protocol is synchronized if the <synchronized> sub-element is "true", and the SRM Ping protocol is not synchronized if the <synchronized> sub-element is "false". If a value of the sub-element is omitted, then it is interpreted as "true".

The <checkInterval> sub-element includes a duration of performing a SRM Ping protocol. In other words, the <checkInterval> sub-element indicates a time between subsequent SRM Ping protocols. If the duration of performing a SRM Ping protocol reaches a duration indicated in the <checkInterval> sub-element, then a SRM Ping protocol is carried out.

The <synchThreshold> sub-element indicates that a SRM Ping protocol is carried out when the number of receiving the TEK requests reaches a predetermined value (for instance, threshold value). For example, if a value of <synchThreshold> is 5, then the DRM agent performs a SRM Ping protocol with the SRM agent whenever receiving the TEK requests from a BCAST client as many as five times. At this time, the DRM agent has an internal counter, and increases the counter one by one whenever receiving the TEK request. Then, the increased counter is compared with a value indicated in the <synchThreshold> sub-element. If the two values are identical to each other or the value of the counter is greater than the other value, then the DRM agent performs the SRM Ping protocol, and initializes the counter to zero. The <synchThreshold> sub-element performs a role of reducing a load that can be generated in the DRM agent and SRM agent due to the SRM Ping protocol while safely checking whether or not there exist BCAST rights in SRM.

A process of checking the constraint (or restriction) may be described as follows.

If SRM is mounted in the terminal, then a DRM agent in the terminal performs a basic negotiation and authorization for communication through a SRM Hello and MAKE (Mutual Authentication & Key Exchange) procedure with a SRM agent, and generates a Secure Authenticated Channel (SAC)

On the other hand, if the reception of OMA MCAST broadcast is requested, then the DRM agent checks the SRM agent whether or not there exist BCAST rights for viewing the BCAST services, and copies (i.e., receives and stores) rights information and REK from the SRM agent. Subsequently, the DRM agent checks whether or not <srmPing> is included within the rights copied from the SRM.

If there exists the <srmPing>, then the DRM agent performs a SRM Ping protocol according to the <srmPing>.

Figure 5:
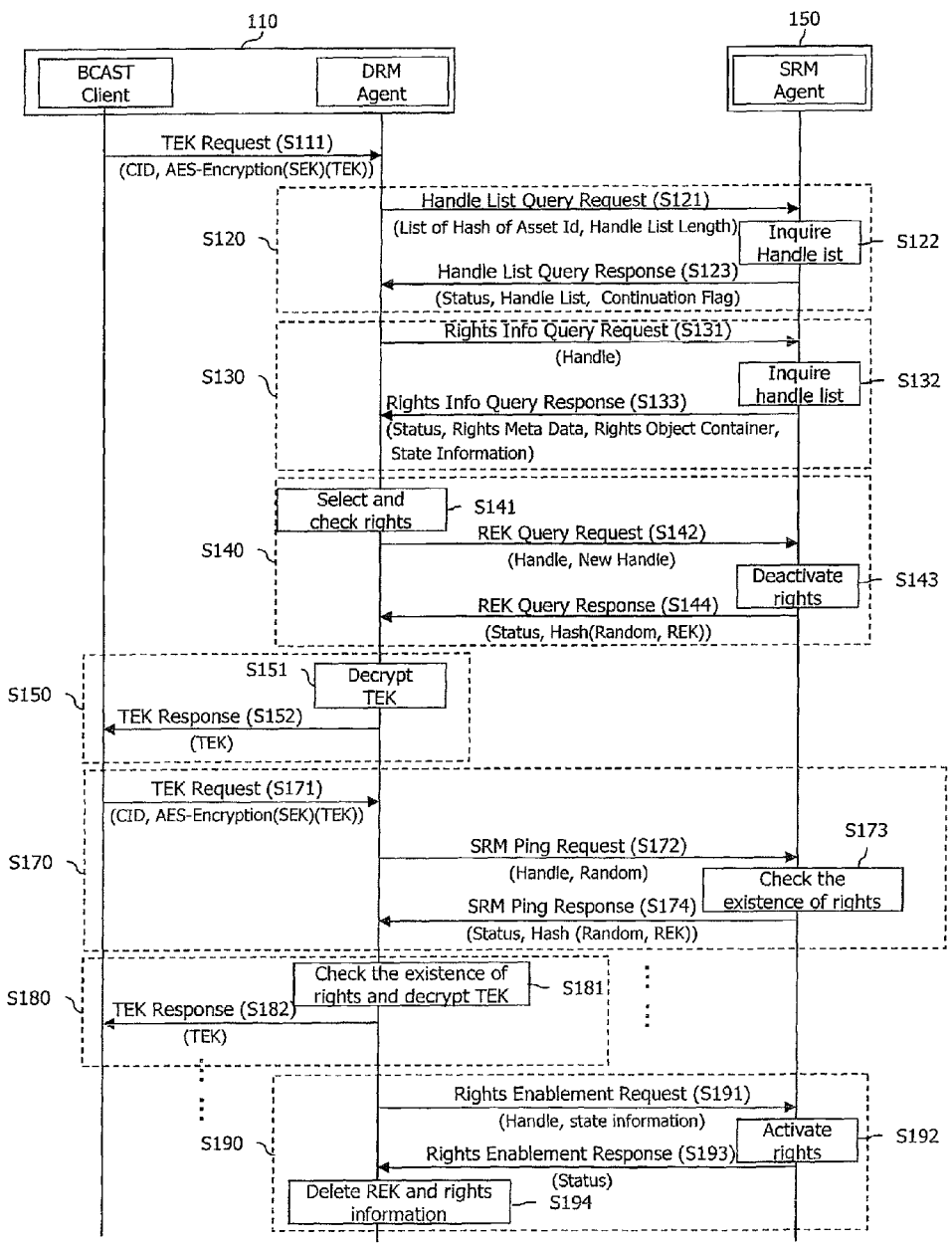
FIG. 5 is a flow chart illustrating a first embodiment of the present invention.

FIG. 5 is a flow chart illustrating a first embodiment of the present invention.

Referring to FIG. 5, according to a first embodiment of the present invention, a rights existence check protocol, namely, SRM Ping protocol, for checking existence or non-existence of right, i.e., BCAST rights, is carried out in synchronization with a TEK request of the BCAST client.

The first embodiment as illustrated in FIG. 5 includes the processes of receiving a TEK request (S111), inquiring a handle list when there exist no rights (S120), inquiring rights information (S130), selecting and checking rights and inquiring REK (S140), decrypting and transferring TEK (S150), checking the existence of rights in synchronization with the reception of a TEK request (S170), decrypting and transferring TEK if rights existence is checked (S180), and restoring the state of rights to an original state if the use of contents is completed (S190).

Specifically, the procedure above is as follows.

First, the process of receiving a TEK request (S111) will be described as follows.

If broadcast contents should be used according to a request of the user of the first terminal 110 or a request of other applications, then a BCAST client within the first terminal 110 transmits, for instance, a TEK request message as illustrated in the drawing, to the DRIVE agent (S111).

The TEK request message is a message for requesting the decryption of TEK included in a Short Term Key Message (STKM) for a BCAST client to view BCAST services/programs/contents. The TEK request message includes TEK encrypted with SEK (or PEK), i.e., AES-Encryption (SEK) (TEK) and CID as illustrated in the drawing. The CID is a content ID, and a unique identifier for distinguishing SEK or PEK. The CID may indicate program_CID or service_CID. Alternatively, if the rights are broadcast rights (or RO), then the rights may indicate program_BCI or service_BCI. The program_BCI and service_BCI will be understood with reference to the OMA BCAST 1.0 standard specification by those skilled in the art, and therefore, they will not be described herein.

2) Next, the process of inquiring a handle list when there exist no rights (S120) will be described as follows.

If the TEK request message is received by the DRM agent, then the DRM agent verifies whether or not there exist BCAST rights corresponding to the CID (i.e., whether or not the DRM agent has a copy of previously received BCAST rights). If there exists the rights within the DRM agent, then the DRM agent immediately decrypts the TEK using at least one of SEK and PEK, and transmits a TEK response message including the decrypted TEK to the BCAST client.

However, if there do not exist the rights, then the DRM agent transmits a list query request message, for instance, Handle List Query Request message, to the SRM agent to search the BCAST rights among the rights stored in the SRM (S121). The list query request message includes a list of hash values of the asset ID corresponding to the CID, and a length of hand list.

The SRM agent inquires a list for Handle stored in the SRM 150. In other words, the SRM agent searches whether or not there exists Handle corresponding to the asset ID.

Then, the SRM agent transmits a list response message, for instance, Handle List Query Response message, to the DRM agent (S123). The list response message includes a status field, and a value of the status is "success" if there exists the handle. However, a value of the status is "fail" if there does not exist the handle. Also, the list response message include an error code.

3) Next, the process of inquiring rights information (S130) will be described as follows.

If the Handle List Query Response message from the SRM agent is received, then the DRM agent checks a handle value included in the message.

Then, the DRM agent transmits a rights information request message, for instance, Rights Info Query Request message, including the checked handle value, to the SRM agent (S131).

The SRM agent searches whether or not there exist rights corresponding to the handle, namely, BCAST rights (S132).

Subsequently, the SRM agent transmits a rights information response message, for instance, Rights Info Query Response message, to the SRM agent (S133). The rights information response message includes rights information if there exist rights corresponding to the handle. Here, the rights information includes rights meta data, rights object container, and state information to the rights.

Furthermore, the rights information response message includes a status field. The status includes "success" or a value corresponding to the success if there exist the rights, and includes "error" or a value corresponding to the error if there do not exist the rights.

4) Next, the process of selecting and checking rights and inquiring REK (S140) will be described as follows.

If the received rights information response message is received, then the DRM agent stores an ID of SRM that has provided the rights information.

The DRM agent selects and checks rights information within the received rights information response message (S141). Specifically, the DRM agent checks a <rights> element within the rights information. Then the DRM agent checks whether or not there exist a constraint (or restriction) for checking whether or not there exist rights within the <rights> element, namely, a <srmPing> element. If there exists the <srmPing> element, the DRM agent checks sub-elements within the <srmPing> element. The <srmPing> element may include at least one of a <synchronized> sub-element, a <synchThreshold> sub-element, and a <checkInterval> sub-element. Hereinafter, as illustrated in FIG. 5, the process will be described by assuming that the <synchronized> sub-element is included within the <srmPing> element.

The DRM agent obtains the rights information, but does not have REK for BCAST rights, and thus the DRM agent is not allowed to access to a Content Encryption Key (CEK). The CEK includes a service encryption key (SEK) or program encryption key (PEK).

Therefore, the DRM agent transmits a REK request message, for instance, REK Query Request message, to the SRM agent in order to obtain the REK (S142). The REK request message includes Handle to rights stored in the SRM, and New Handle generated for the rights. The New Handle is known to only the DRM agent, and therefore, other DRM agents cannot access the relevant rights. Furthermore, the REK acquisition request message includes information for requesting to change the rights to an inactive state or disablement status within the SRM.

When receiving the REK request message, the SRM agent changes the Handle to the New Handle for the rights corresponding to the Handle, and changes the rights to an inactive state or disablement status (S143). The inactive or disabled rights can be changed again to an active state or enablement status by only the DRM agent knowing the New Handle.

Subsequently, the SRM agent transmits a REK response message, for instance, REK Query Response message, including REK of the rights, to the DRM agent (S144). The REK response message a status. The status indicates success or failure of the inactiveness or disablement, i.e., whether or not a changing to the New Handle is successful. The REK response message may further include a hash value. For this purpose, the SRM agent generates a random value, and generates the hash value to the REK and the generated random value.

5) Next, the process of decrypting and transferring TEK (S150) will be described as follows.

When receiving the REK response message, the DRM agent decrypts CEK within a <rights> element within the rights information using REK within the REK response message, and decrypts TEK using the decrypted CEK (including SEK or PEK) (S151).

In other words, AES-Encryption {REK} (CEK)→Decrypt by using REK→CEK=SEK or PEK

AES-Encryption {SEK} (TEK) or AES-Encryption {PEK} (TEK)→Decrypt by using SEK or PEK→TEK Here, ABS-Encryption {x} (y) indicates an AES-encrypted value of a plaintext y using an encryption key x. The encryption to this is performed by using the encryption key x to obtain a decryption result y.

The DRM agent transmits a TEK response message to the BCAST client in response to the TEK request of the process S111 (S152). The TEK response message includes the decrypted TEK. At this time, the TEK response message may further include a status field. If the decryption is successful, the status includes "success" or a value corresponding to the success. On the contrary, if the decryption is failed, the status includes "fail" or a value corresponding to the failure. Also, the TEK response message may further include a status code. The status code is set to "TEK Decryption Failed" if the decryption is failed.

The BCAST client consumes contents broadcasted from the broadcast server 500 using the TEK.

6) Next, the process of checking the existence of rights (S170) in synchronization with the reception of a TEK request (S161) will be described as follows. If the process reaches a predetermined duration or preset timing while the BCAST client consumes contents using the TEK, then the BCAST client retransmits a TEK request message to the DRM client (S171). The TEK request message is similar to the foregoing description, and is not further described.

When receiving the TEK request message, the DRM agent performs the SRM Ping protocol according to a <synchronized> sub-element within the <srmPing> element.

Specifically, the DRM agent transmits a rights existence check request message or SRM Ping Request message to the SRM agent in order to check whether or not there exist rights within the SRM (S172). At this time, the rights existence check request message or SRM Ping Request message includes the New Handle equivalent to the rights corresponding to CID included in the TEK request message. Also, the rights existence check request message or SRM Ping Request message may further include a random value. For this purpose, the DRM agent generates the random value. The random value may be implemented to be generated by using, for example, a Pseudo-Random algorithm. The random value has an advantage of securing the latestness of the rights existence check request message or SRM Ping Request message, as well as preventing replay attack. On the other hand, the DRM agent maintains the storage of the random value until the rights existence check response message or SRM Ping Response message is received, and determines whether or not a replay attack occurs when receiving the rights existence check response message or SRM Ping Response message later.

The rights existence check request message or SRM Ping Request message may include the following fields.

TABLE 7

| Field | Description |
| --- | --- |
| Handle | Handle is a value indicating BCAST rights which is required to check the existence or non-existence thereof to receive BCAST services among the rights to be stored in SRM. Handle is a value indicating rights stored in SRM. |
| RAND | RAND is a random value generated by the DRM agent. RAND is a value for preventing a replay of hash data for checking the check existence or non-existence of BCAST Rights by the DRM agent subsequent to SRM Ping Response. |

If the rights existence check request message or SRM Ping Request message is received, then the SRM agent verifies integrity. Then, the SRM agent finds rights corresponding to the Handle within the SRM (S173).

If the rights corresponding to the Handle are found, then the SRM agent generates a random value included in the received message and a hash value to REK of the rights corresponding to the Handle, and then transmits a rights existence check response message or SRM Ping Response message including the generated hash value to the DRM agent (S174). At this time, the reason for transferring the hash value is to inform that the DRM agent actually possesses rights without disclosing the REK. The hash value may be generated by using a SHA-1 hash algorithm. The rights existence check response message or SRM Ping Response message may further include a status field. If the rights existence check request message or SRM Ping Request message is well defined and a HMAC value is successfully verified and there exist the rights within the SRM, then the status field is set to "success".

The rights existence check response message or SRM Ping Response message may include fields as illustrated in the following table.

TABLE 8

| Field | Description |
| --- | --- |
| Status | A result of processing SRMPingRequest message. The status value is defined in Table 9. If any error is included in the status, then the SrmPingResponse message includes only the status field. |
| Hash Data | H(RAND | REK). RAND is a value received from the DRM agent through the SRM Ping Request message, and REK indicates REK to the rights corresponding to the Handle of the SRM Ping Request. If the hash data is used for BCAST services, |

TABLE 8-continued

| Field | Description |
| --- | --- |
| | then this value indicates REK of BCAST rights. H( ) indicates a SHA-1 Hash algorithm. Hash data is a value hashed with RAND and REK, and the RAND and REK are concatenated to each other. |

The values of status are illustrated in the following Table 9.

TABLE 9

| Status Value | Description |
| --- | --- |
| Success | Processing of the SRM Ping Request message is successfully carried out. |
| Field Integrity Verification Failed | Verification for a HMAC value to the SRM Ping Request message is failed. In other words, Field Integrity Verification Failed indicates a case where a HMAC value to the SRM Ping Request message is generated by the SRM agent and then compared with a MAC value included in the SRM Ping Request message, but they are not identical to each other. |
| Handle Not Found | There exist no rights requested and checked by the DRM agent in SRM. In other words, there exists no Handle included in the SRM Ping Request. |
| Parameter Failed | The field of the SRM Ping Request has an improper length and structure. |
| Unknown Error | Other errors. |

7) Next, the process of decrypting and transferring TEK if the rights are determined to exist (S180) will be described as follows.

If the DRM agent receives the rights existence check response message or SRM Ping Response message, then the DRM agent verifies the integrity through the verification of a HMAC field to the message.

If the HMAC verification is failed, the status is not set to "success", or the DRM agent is unable to receive a correct SRM Ping Response, then the SRM Ping protocol is regarded failed. Then, the DRM agent finishes the SRM Ping protocol and suspends the use of BCAST rights. Then, the DRM agent sets the status of the TEK response message to "fail", and transmits an error code "Rights Presence Verification Fail" to the BCAST client.

On the contrary, if the integrity verification is successfully completed, then the DRM agent verifies a hash value included in the received message. The DRM agent can check whether or not there exist the rights within the SRM through the verification. For the verification of the hash value, the DRM agent generates a random value within the received message and a value hashed with the REK by the DRM agent, and then compares with a hash value within the received message.

If the two values are identical, then the DRM agent determines that there exist the rights in SRM. Then, if the rights are determined to exist, then the DRM agent decrypts TEK (S181). The TEK decryption is similar to the foregoing description, and is not further described.

8) Next, the process of restoring the state of rights to an original state if the use of contents is completed (S190) will be described as follows.

If the user of the broadcast contents is finished in the BCAST client, then the DRM agent transmits a rights enablement request message, for instance, Rights Enablement Request message, to the SRM agent (S191). The rights enablement request message includes Handle to the rights and state information (in case of Stateful Rights) to the rights.

If the rights enablement request message is received, then the SRM agent activates or enables rights that have been inactivated within the SRM (S192). From this time, if the SRM is mounted in another terminal, then the rights within the SRM will be approached by a DRM agent within the another terminal.

If the activation or enablement is successful, then the SRM agent generates a rights enablement response message, for instance, Rights Enablement Response message, including the status indicating "success". Then, the SRM agent transmits the generated message to the DRM agent (S193).

If the rights enablement response message is received, then the DRM agent checks the status within the message. If the status is successful, then the DRM agent deletes both REK and rights information corresponding to the rights that have been temporarily stored (S194).

Figure 6:
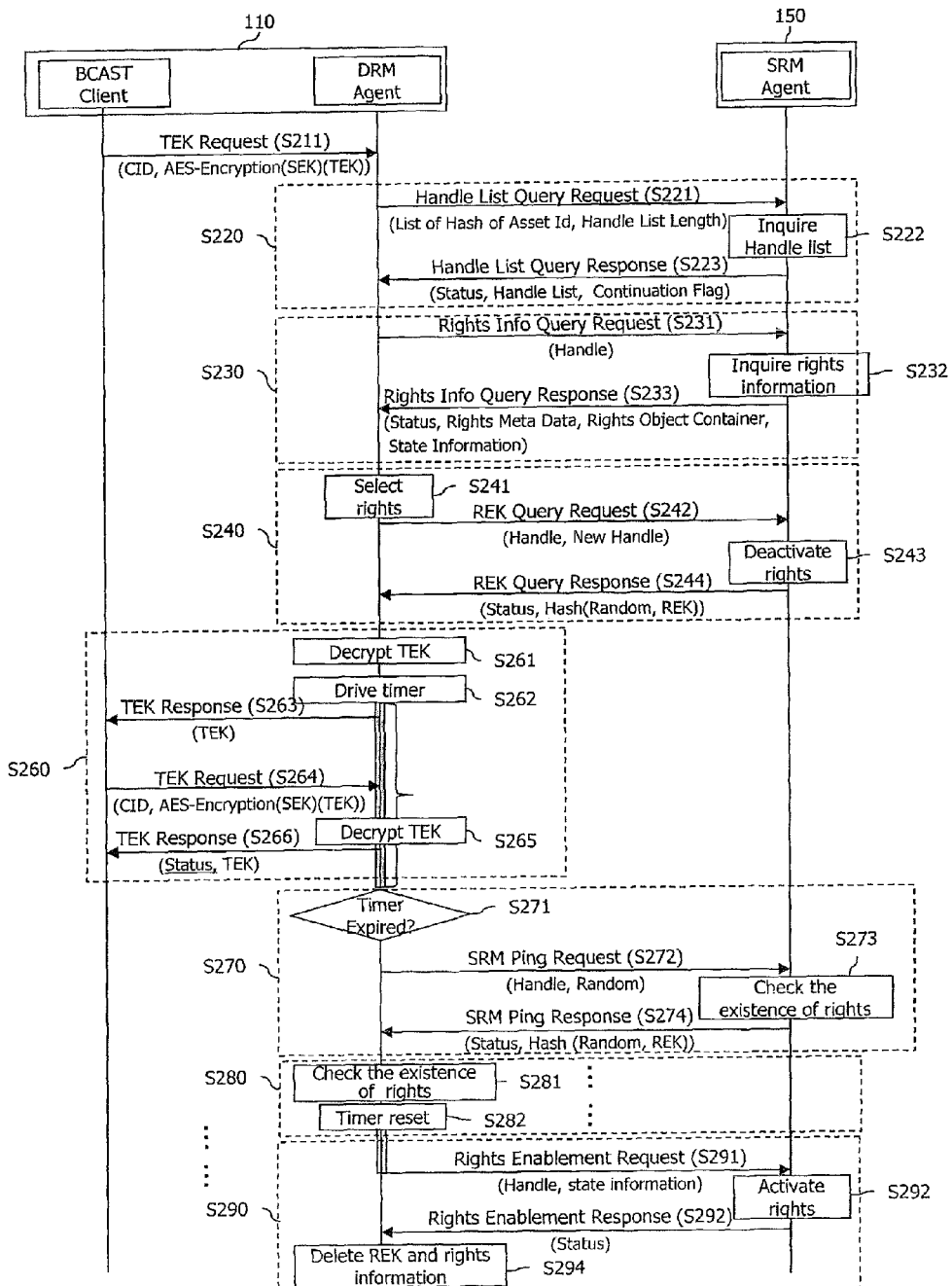
FIG. 6 is a flow chart illustrating a second embodiment of the present invention.

FIG. 6 is a flow chart illustrating a second embodiment of the present invention.

As seen by referring to FIG. 6, according to a second embodiment of the present invention, a rights existence check protocol, namely, SRM Ping protocol, is carried out for each predetermined duration.

In other words, according to the second embodiment, if a <checkInterval> sub-element is included in a <srmPing> element within the rights, then the DRM agent responds to a TEK request from the BCAST client using rights information and REK obtained in the processes of S230 and S240 until a timer to a duration indicated within the <checkInterval> sub-element is finished. If the timer is finished, then the DRM agent performs a SRM Ping protocol.

The second embodiment as illustrated in FIG. 6 includes the processes of receiving a TEK request (S211), inquiring a handle list when there exist no rights (S220), inquiring rights information (S230), selecting and checking rights and inquiring REK (S240), driving a timer and decrypting and transferring TEK until the completion of the timer (S260), checking the existence of rights at the completion of the timer (S270), resetting a timer and decrypting and transferring TEK until the completion of the timer (S280), and restoring the state of rights to an original state if the use of contents is completed (S290).

1-4) The processes of receiving a TEK request (S211), inquiring a handle list when there exist no rights (S220), inquiring rights information (S230), and selecting and checking rights and inquiring REK (S240) are similar to each process illustrated in FIG. 5, and the description of FIG. 5 will be applied mutatis mutandis.

5) Next, the process of driving a timer and decrypting and transferring TEK until the completion of the timer (S260) will be described as follows.

When receiving the REK response message (S244), the DRM agent decrypts CEK within a <rights> element within the rights information using REK within the REK response message, and decrypts TEK using the decrypted CEK (including SEK or PEK) (S261).

In other words, AES-Encryption {REK} (CEK)→Decrypt by using REK→CEK=SEK or PEK

AES-Encryption {SEK} (TEK) or AES-Encryption {PEK} (TEK)→Decrypt by using SEK or PEK→TEK Here, AES-Encryption {x} (y) indicates an AES-encrypted value of a plaintext y using an encryption key x. The encryption to this is performed by using the encryption key x to obtain a decryption result y.

If the decryption of the TEK is completed, then the DRM agent drives a timer, for instance, Ping timer, according to a duration indicated within the <checkInterval> sub-element (S262). If the timer is finished, i.e., the timer reaches a duration indicated in the <checkInterval> sub-element, then the DRM agent implements a SRM Ping protocol, and resets the timer again to repeatedly implement the SRM Ping protocol.

The DRM agent transfers a TEK response message including the decrypted TEK to the BCAST client (S263).

If a TEK request message is received from the BCAST client prior to the completion of the timer (S264), then the DRM agent decrypts TEK using rights information and REK obtained in the processes of S230 and S240 (S265), and transmits a REK response message including the decrypted TEK to the BCAST client (S266). The TEK response message may further include a status field. If the timer is not completed, the status includes "success" or a value corresponding to the success. On the contrary, if the timer is completed and a SRM Ping protocol is carried out but failed, the status is set to indicate "fail" or a value corresponding to the failure. At this time, the status code is set to "Rights Presence Verification Failed" if the failure is caused by an error in the rights existence check process, and the status code is set to "TEK Decryption Failed" if the failure is caused by an error in the TEK decryption.

6) Next, the process of checking the existence of rights at the completion of the timer (S270) will be described as follows.

On the other hand, if the timer is completed (S271), then the DRM agent performs a SRM Ping protocol to the SRM agent (S272-S274). Those processes (S272-S274) are similar to the processes (S172-S174) as illustrated in FIG. 5, respectively, and the description of FIG. 5 will be applied mutatis mutandis.

7) Next, the process of resetting a timer and decrypting and transferring TEK until the completion of the timer (S280) will be described as follows.

If the SRM Ping protocol is successfully carried out and the rights are determined to exist within the SRM (S281), then the DRM agent resets the timer (S282).

If a TEK request message is received from the BCAST client prior to the completion of the timer, then the DRM agent decrypts TEK using rights information and REK obtained in the processes of S230 and S240, and transmits a TEK response message including the decrypted TEK to the BCAST client.

8) On the other hand, if the use of the broadcast contents is finished in the BCAST client, then the DRM agent performs the process of restoring the state of rights to an original state (S290). S290 is similar to the process of S190 as illustrated in FIG. 5, and the description of FIG. 5 will be applied mutatis mutandis.

On the other hand, FIG. 5 illustrated an operation in case that a <synchronized> sub-element is included in a <srmPing> element, and FIG. 6 illustrated an operation in case that a <checkInterval> sub-element is included within a <srmPing> element within the rights. The description of an operation in case that a <synchThreshold> sub-element is included within a <srmPing> element within the rights is easily understood by those skilled in the art from the description of FIGS. 5 and 6, and therefore, the illustration thereof will be omitted. It should be construed that the operation in case that a <synchThreshold> sub-element is included within a <srmPing> element within the rights is also included in the present invention.

Figure 7:
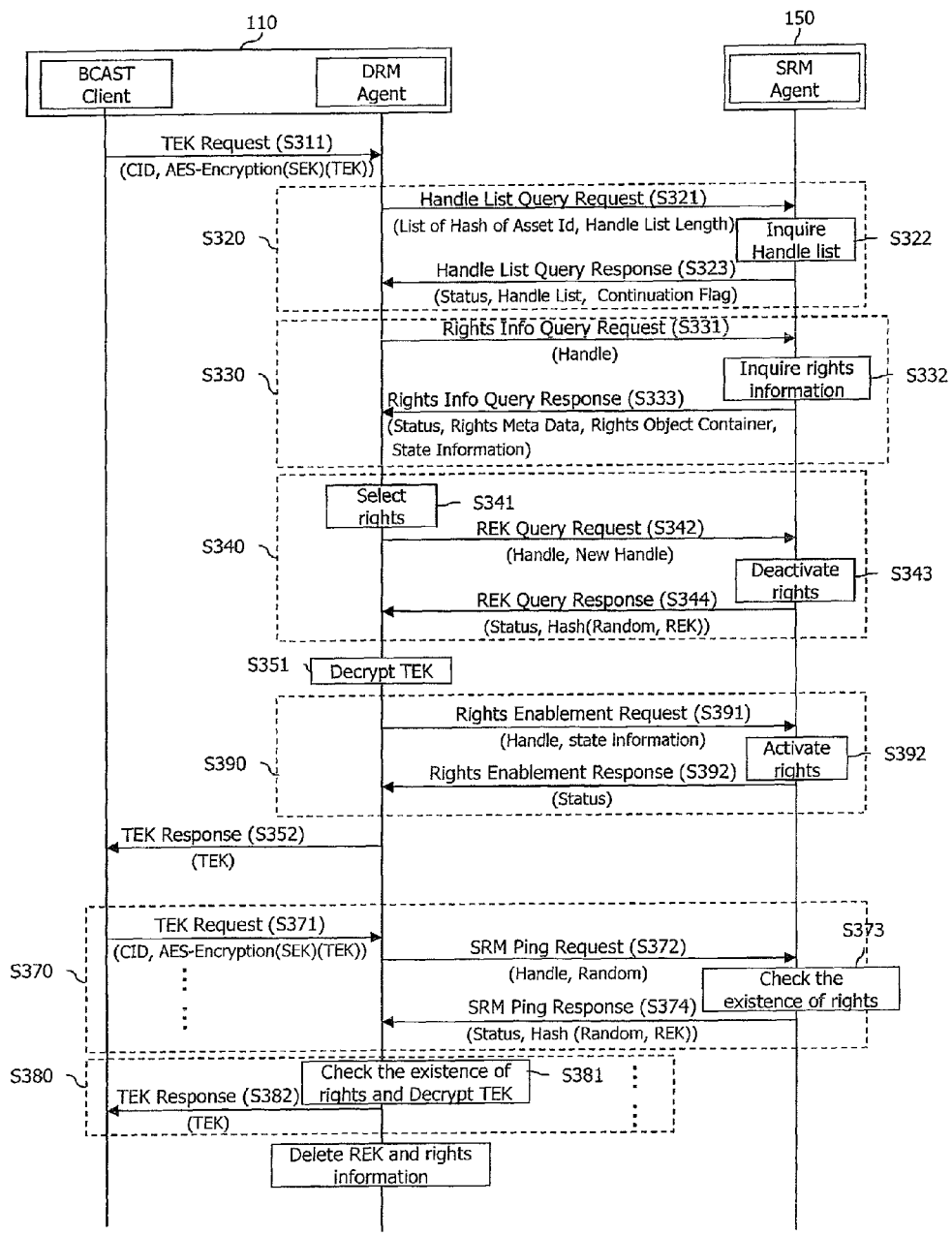
FIG. 7 is a flow chart illustrating a third embodiment of the present invention.

FIG. 7 is a flow chart illustrating a third embodiment of the present invention.

Differently from the first and second embodiments as illustrated in FIGS. 5 and 6, a third embodiment as illustrated in FIG. 7 performs a process of restoring the state of rights to an original state (S390) if TEK is decrypted by a DRM agent using rights information and REK obtained from the SRM agent (S351).

The third embodiment as illustrated in FIG. 7 includes the processes of receiving a TEK request (S311), inquiring a handle list when there exist no rights (S320), inquiring rights information (S330), selecting and checking rights and inquiring REK (S340), restoring the state of rights within SRM to an original state (S390) if the encryption of the TEK (S351) is successfully completed, checking the existence of rights (S370), and decrypting and transferring TEK if the rights are determined to exist (S380). The foregoing processes will be described in detail as follows.

1-4) The processes of receiving a TEK request (S311), inquiring a handle list when there exist no rights (S320), inquiring rights information (S330), and selecting and checking rights and inquiring REK (S340) are similar to each process illustrated in FIG. 5, and the description of FIG. 5 will be applied mutatis mutandis.

5) Next, if the encryption of the TEK (S351) is successfully completed, then the process of selecting and checking rights and inquiring REK (S340), restoring the state of rights within SRM to an original state (S390) will be carried.

When receiving the REK response message (S344), the DRM agent decrypts CEK within a <rights> element within the rights information using REK within the REK response message, and decrypts TEK using the decrypted CEK (including SEK or PEK) (S351).

If the encryption (S351) is successfully completed, then the DRM agent performs the process of restoring the state of rights within the SRM to an original state (S390). In other words, the DRM agent transmits a rights enablement request message, for instance, Rights Enablement Request message, to the SRM agent (S391), and the SRM agent activates or enables rights that have been inactivated within the SRM (S392). Then, the SRM agent transmits a rights enablement response message, for instance, Rights Enablement Response message, to the DRM agent (S393).

Then, the DRM agent transmits a TEK response message including the decrypted TEK to the BCAST client (S352).

6) Next, the process of checking the existence of rights (S370) will be carried out. The process of checking the existence of rights (S370) may be performed in synchronization with a TEK request message as illustrated the first embodiment of FIG. 5, or may be performed when the timer is completed as illustrated in the second embodiment of FIG. 6. Alternatively, the process of checking the existence of rights (S370) may be performed whenever the number of receiving the TEK requests reaches a predetermined threshold value indicated in the <synchThreshold> sub-element.

7) Next, if the rights are determined to exist, then the process of decrypting and transferring TEK (S380) will be carried out. The process S380 is similar to the process S180 as illustrated in FIG. 5, and the description of the process S180 will be applied mutatis mutandis.

8) On the other hand, if the use of contents is finished, then the DRM agent deletes both REK and rights information corresponding to the rights that have been temporarily stored.

Figure 8:
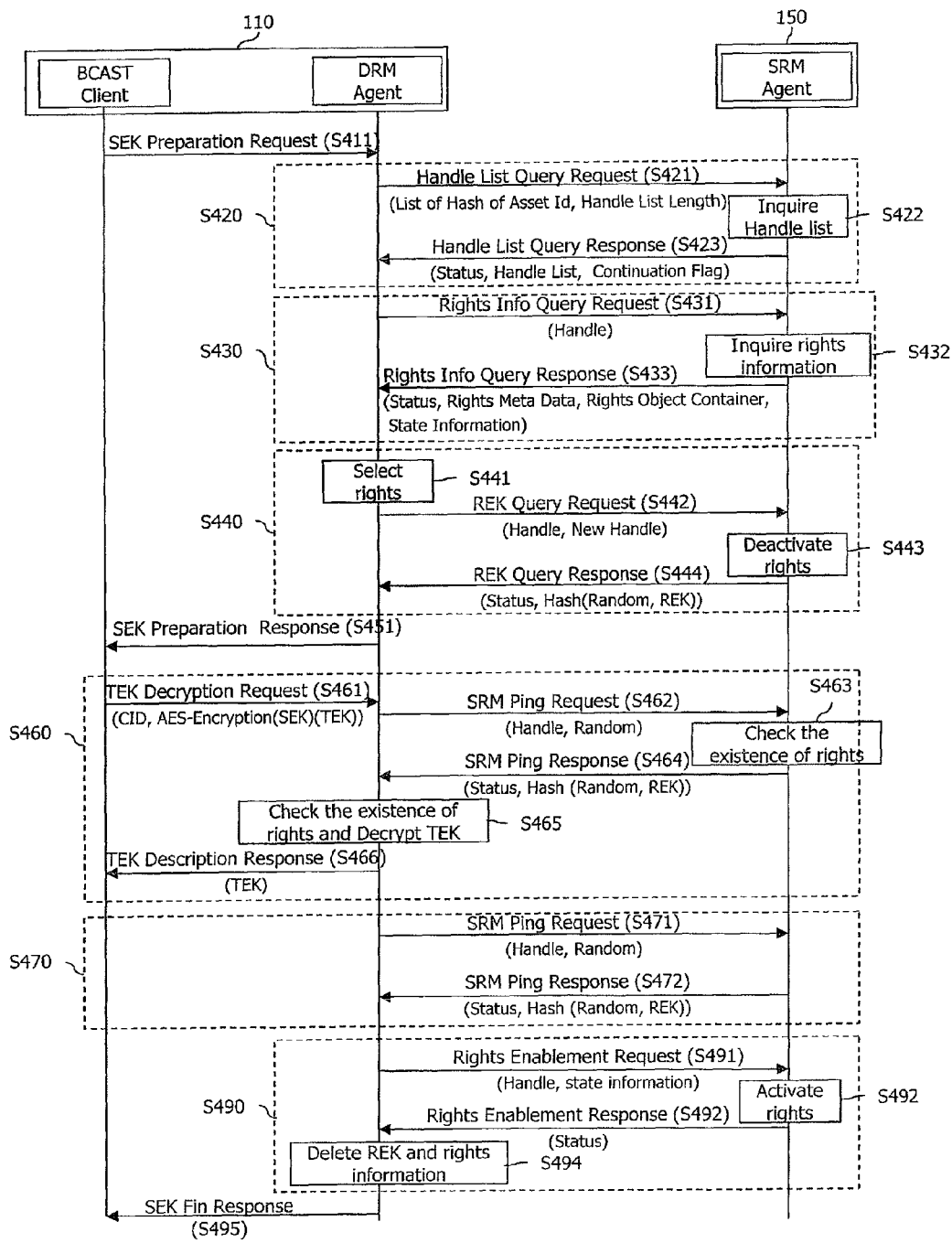
FIG. 8 is a flow chart illustrating a fourth embodiment of the present invention.

FIG. 8 is a flow chart illustrating a fourth embodiment of the present invention.

The fourth embodiment as illustrated in FIG. 8 includes the processes of requesting preparation (S411), inquiring a handle list (S420), inquiring rights information (S430), selecting and checking rights and inquiring REK (S440), transferring a preparation complete response (S451), checking the existence of rights and then transferring TEK according to a TEK request (S460), checking the existence of rights and transferring TEK (S470), and restoring the state of rights within SRM to an original state if the use of contents is completed (S490).

The fourth embodiment of the present invention as illustrated in FIG. 8 illustrates an example in which a protocol between the BCAST client and the DRM agent, i.e., transmitted or received message, is modified.

Accordingly, hereinafter, the processes of inquiring a handle list (S420), inquiring rights information (S430), selecting and checking rights and inquiring REK (S440), and restoring the state of rights within SRM to an original state if the use of contents is completed (S490) will not be described in detail.

Hereinafter, the processes of requesting preparation carried out between the BCAST client and the DRM agent (S411), transferring a preparation complete response (S451), and checking the existence of rights and then transferring TEK according to a TEK request (S460) will be described.

1) First, the process of requesting preparation (S411) will be described as follows.

If broadcast contents should be used according to a request of the user of the first terminal 110 or a request of other applications, the BCAST client within the first terminal 110 transmits a preparation request message, for instance, SEK Preparation Request message, as illustrated in the drawing, to the DRM agent (S411).

The preparation request message includes CID. The CID is a content ID, and a unique identifier for distinguishing SEK or PEK. The CID may indicate program_CID or service_CID. Alternatively, if the rights are broadcast rights (or RO), then the CID may indicate program_BCI or service_BCI.

2-4) The processes of inquiring a handle list (S420), inquiring rights information (S430), and selecting and checking rights and inquiring REK (S440) are similar to each process illustrated in FIG. 5, and the description of FIG. 5 will be applied mutatis mutandis.

5) Next, the process of transferring a preparation complete response (S451) will be carried out.

If the REK response message is received (S444), then the DRM agent decrypts CEK within a <rights> element within the rights information using REK within the REK response message to obtain SEK or PEK from the decrypted CEK.

If the SEK or PEK is obtained as described above, then the DRM agent transmits a preparation complete response message, for instance, SEK Preparation Response message, to the BCAST client (S451).

6) Next, the process of checking the existence of rights and then transferring TEK according to a TEK request (S460) will be carried out.

The DRM agent receives a TEK request message, for instance, TEK Description Request message, from the BCAST client (S461). The TEK Description Request message includes CID as described above. Also, the TEK Description Request message includes TEK encrypted with SEK (or PEK), namely, AES-Encryption (SEK) (TEK).

Then, the DRM agent transmits a rights existence check request message or SRM Ping Request message to the SRM agent (S462). At this time, the rights existence check request message or SRM Ping Request message includes the New Handle equivalent to the rights corresponding to the CID. Also, the rights existence check request message or SRM Ping Request message may further include a random value.

If the rights existence check request message or SRM Ping Request message is received, then the SRM agent verifies integrity. then the SRM agent finds rights corresponding to the Handle within the SRM (S463). If the rights corresponding to the Handle are found, then the SRM agent generates a random value included in the received message and a hash value to REK of the rights corresponding to the Handle, and then transmits a rights existence check response message or SRM Ping Response message including the generated hash value to the DRM agent (S464).

If the rights existence check response message or SRM Ping Response message is received, then the DRM agent decrypts TEK using the SEK or PEK (S465).

Then, the DRM agent a TEK response message including the decrypted TEK, for instance, TEK Description Response message, to the BCAST client (S466).

Then, the BCAST client consumes broadcast contents using the TEK.

7) Next, the process of checking the existence of rights and transferring TEK (S470) while using the broadcast contents will be carried out.

The process of checking the existence of rights (S470) may be performed in synchronization with a TEK request message as illustrated in the first embodiment of FIG. 5, or may be performed when the timer is completed as illustrated in the second embodiment of FIG. 6. Alternatively, the process of checking the existence of rights (S470) may be performed whenever the number of receiving the TEK requests reaches a predetermined threshold value indicated in the <synchThreshold> sub-element.

8) Next, if the use of the broadcast contents is finished in the BCAST client, then the DRM agent performs the process of restoring the state of rights within the SRM to an original state (S490). S490 is similar to the process S190 as illustrated in FIG. 5, and the description of FIG. 5 will be applied mutatis mutandis.

9) On the other hand, the DRM agent transmits a completion request message, for instance, SEK completion request message, to the BCAST client (S495). The completion request message may further include information on a result in which rights within the SRM is activated, and a result in which the rights temporarily stored in the terminal is deleted.

Figure 9:
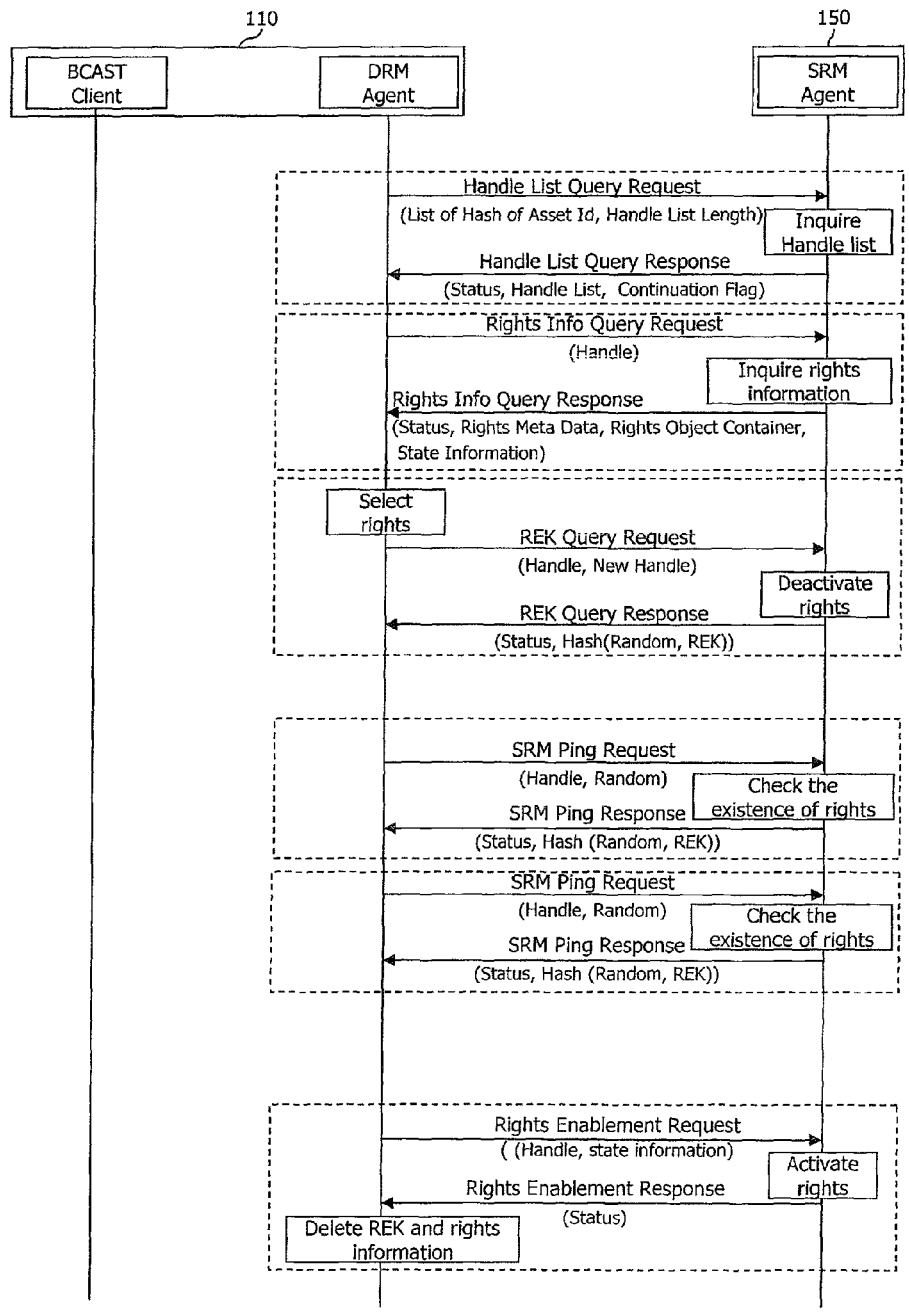
FIG. 9 is an exemplary view in which preferred embodiments of the present invention are illustrated from the viewpoint of a protocol between a DRM agent and a SRM agent.

FIG. 9 is an exemplary view in which preferred embodiments of the present invention are illustrated from the viewpoint of a protocol between a DRM agent and a SRM agent.

An exemplary view as shown in FIG. 9 illustrates that the existence of a message, namely, SRM, is checked according to the constraint (or restriction) <srmPing> when a terminal consumes BCAST rights. Specifically, the process will be described as follows.

1) First, rights are retrieved from SRM.

Specifically, if Handle corresponding to the rights of broadcast contents is unknown, then the corresponding Handle is obtained by using a list query process, namely, Handle List Query process.

Subsequently, rights information is obtained from SRM through a rights information inquiry process, namely, Handle List Query process. At this time, an ID of SRM that has provided the rights information is stored.

Subsequently, REK is obtained from the SRM through a REK inquiry process, namely, REK Query process.

2) Next, rights are used to consume broadcast contents, and a process of checking the existence of rights is carried out.

While using the rights to consume broadcast contents, a rights existence check process, namely, SRM Ping protocol, is carried out to check whether or not the SRM that has provided rights is mounted therein.

If the <srmPing> constraint (or restriction) is included in the rights, the SRM Ping protocol should be performed to use the rights. If the SRM Ping protocol is not supported, then the rights including the <srmPing> constraint (or restriction) cannot be used. Accordingly, the DRM agent should support the SRM Ping protocol. For this purpose, the DRM agent should support a DRM time. The SRM agent should also support the SRM Ping protocol.

The SRM Ping protocol is carried out between the DRM agent and the SRM agent. SAC should be configured between the DRM agent and the SRM agent to perform the SRM Ping protocol.

The SRM Ping protocol is started by transmitting a SRM Ping Request message from the DRM agent to the SRM agent. The SRM agent performs a verification and then transmits a SRM Ping Response message to the DRM agent.

If a time between two-consecutive executions indicated in a <checkInterval> sub-element within the rights is specified, then the DRM agent repeatedly performs the SRM Ping protocol. If there does not exist the <checkInterval> sub-element, then the SRM Ping protocol is carried out just prior to each call of BCAST STKM.

If the SRM Ping protocol is finished due to failure, or not successfully carried out, then the DRM agent suspends the use of the rights. Then, the DRM agent deletes REK corresponding to the temporarily stored rights.

3) On the other hand, if the consumption of the broadcast contents is finished, then the use of rights is completed.

If the use of rights is completed by finishing the consumption of the broadcast contents, then the DRM agent suspends the execution of the SRM Ping protocol, and activates rights within the SRM using Rights Enablement protocol, for instance. Then, the DRM agent deletes REK corresponding to the temporarily stored rights.

Figure 10:
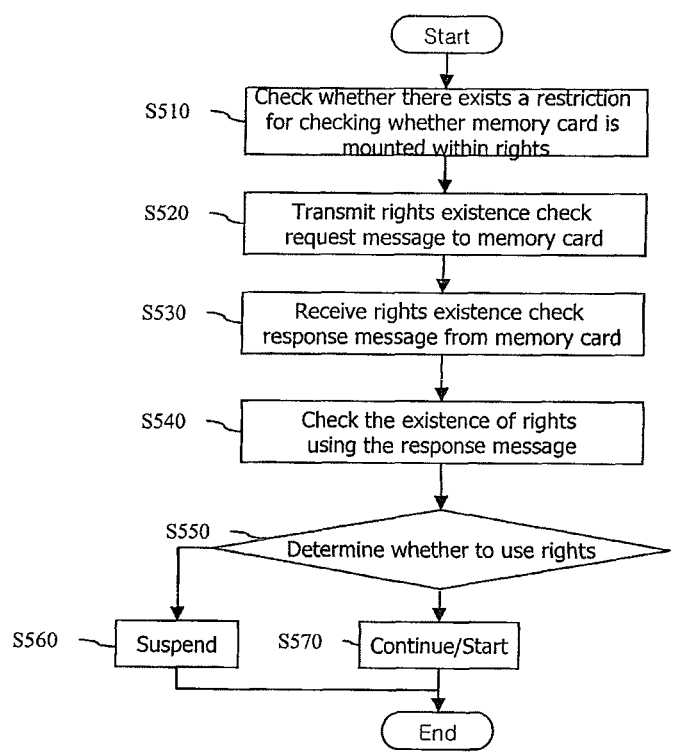
FIG. 10 is a flow chart illustrating the operation of a terminal according to the present invention.

FIG. 10 is a flow chart illustrating the operation of a terminal according to the present invention.

The DRM agent checks whether or not there exists a constraint (or restriction) for checking whether there exist rights within a memory card exists within rights to broadcast contents (S510).

If there exists the constraint (or restriction), then the DRM agent transmits a rights existence check request message to the memory card (S520). At this time, the rights existence check request message may include identification information to the rights and a random value.

The DRM agent receives a rights existence check response message including a hash value from the memory card (S530). At this time, the hash value may be obtained for at least one of the random value and predetermined information within the rights.

Then, the DRM agent checks whether or not there exist the rights within the SRM (S540). At this time, the check may be made by using the hash value.

Subsequently, the process determines whether or not the broadcast contents is used according to existence or non-existence of the rights (S550).

The DRM agent does not start or suspend to use the rights if there do not exist the rights (S560).

However, the DRM agent starts or continues to use the rights if there exist the rights (S570).

The method according to the present invention as described above may be implemented by software, hardware, or a combination of both. For example, the method according to the present invention may be stored in a storage medium (e.g., internal memory, flash memory, hard disk, and so on), and may be implemented through codes or instructions in a software program that can be performed by a processor such as microprocessor, controller, micro controller, ASIC (application specific integrated circuit), and the like. Hereinafter, the process will be described with reference to FIG. 11.

Figure 11:
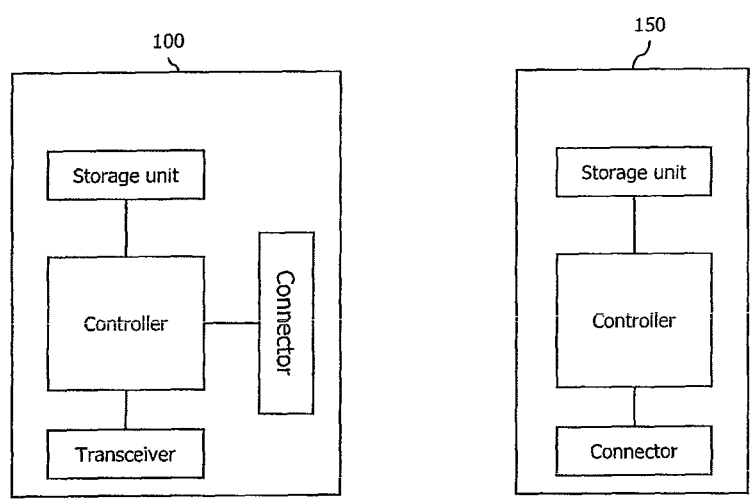
FIG. 11 is a configuration block diagram illustrating a terminal 100 and a SRM 150 according to the present invention.

FIG. 11 is a configuration block diagram illustrating a terminal 100 and a SRM 150 according to the present invention.

As illustrated in FIG. 11, the terminal 100 may include a storage unit, a transmitting and receiving unit, a connector, and a controller. Furthermore, the memory card, i.e., SRM, may include a storage unit, a connector, and a controller.

The connector connects the terminal 100 and the memory card, i.e., SRM, with each other.

The storage units store a software program implementing the foregoing method as illustrated in FIGS. 4 through 8. Also, the storage units store information within each of the received messages.

Each of the controllers controls the storage units and the transmitting receiving units, respectively. Specifically, the controllers implements the foregoing methods, respectively, stored in each of the storage units.

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

What is claimed is:

1. A method of using rights corresponding to broadcast contents in a terminal having a memory card attached thereto, the method comprising:

checking, by the terminal, whether or not rights corresponding to broadcast contents include a constraint for verifying an existence of the memory card and an existence of the rights within the memory card; and if the rights includes the constraint, performing, by the terminal, a procedure for verifying the existence of the memory card and the existence of the rights within the memory card, the performing of the procedure for verifying including:

transmitting, from the terminal to the memory card, a request message for verifying the existence of the memory card and the existence of the rights within the memory card;

receiving, by the terminal, a response message from the memory card; and continuing/initiating or stopping/not initiating a consumption of the rights according to whether the response message is valid or not, wherein the constraint comprises at least one of:

a synchronized element indicating that the verification of the existence of the rights should be performed in synchronization with a traffic encryption key (TEK) request, a sync Threshold element indicating that the verification of the existence of the rights should be performed when a reception of the TEK request exceeds a predetermined threshold value, and a check Interval element indicating that the verification of the existence of the rights should be repeatedly performed for a predetermined duration, wherein if the synchronized element is not present, the sync Threshold element is not present, and wherein if the synchronized element is set to true, the check Interval element is not present.

2. The method of claim 1, wherein the request message is transmitted according to the request of a TEK.

3. The method of claim 1, wherein the constraint is a Secure Removable Media Ping (SRMPing) element.

4. The method of claim 1, wherein the step of transmitting the request message comprises:

receiving, by a digital rights management (DRM) agent within the terminal, a TEK request message from a broadcast (BCAST) client within the terminal; and transmitting the request message in response the TEK request message received by the DRM agent.

5. The method of claim 1, wherein the step of transmitting the request message comprises:

determining, by a DRM agent within the terminal, whether or not a number of TEK request messages received from a BCAST client exceeds a threshold value indicated within the constraint; and transmitting the request message when the threshold value is exceeded.

6. The method of claim 1, wherein the step of transmitting the request message comprises:

checking whether or not a time element reaches a predetermined duration indicated in the constraint; and transmitting the request message when the predetermined duration is reached.

7. The method of claim 1, further comprising:

determining, by the terminal, whether or not the rights corresponding to the broadcast contents exist within the memory card in synchronization with a TEK request if there is no information about a predetermined duration in the constraint.

8. The method of claim 1, wherein information within the rights is a rights object encryption key (REK).

9. The method of claim 1, wherein the request message comprises rights identification information and a random value.

10. The method of claim 9, wherein the rights identification information is a Handle.

11. The method of claim 9, wherein the response message comprises a hash value obtained for at least one of the random value and predetermined information within the rights.

12. The method of claim 11, wherein the step of determining whether or not the rights corresponding to the broadcast contents exist comprises:

obtaining, from a storage in the terminal, a hash value for the at least one of the random value and the predetermined information within the rights; and comparing the obtained hash value with the hash value within the response message.

13. The method of claim 12, wherein the step of determining whether or not the rights corresponding to the broadcast contents exist comprises:

determining that the rights exist within the memory card if the obtained hash value is identical to the hash value within the response message, and determining that the rights do not exist within the memory card if the obtained hash value is not identical to the hash value within the response message or if the hash value does not exist within the response message.

14. A method of providing rights for broadcast contents from a memory card to a terminal, the method comprising:

providing, by the memory card to the terminal, rights corresponding to the broadcast contents, wherein the rights includes a constraint for verifying an existence of the memory card and an existence of the rights within the memory card;

deactivating the rights by the memory card;

receiving, by the memory card, a request message for verifying the existence of the memory card and the existence of the rights within the memory card from the terminal, wherein the request message comprises identification information for the rights and a random value;

checking, by the memory card, whether or not the rights exist;

if the rights are determined to exist, generating, by the memory card, a hash value for at least one of the random value and predetermined information within the rights; and transmitting a response message including the hash value to the terminal, wherein the constraint comprises at least one of:

a synchronized element indicating that a verification of the rights should be performed in synchronization with a traffic encryption key (TEK) request, a sync Threshold element indicating that the verification of the rights should be performed when a reception of the TEK request exceeds a predetermined threshold value, and a check Interval element indicating that the verification of the rights should be repeatedly performed for a predetermined duration, wherein if the synchronized element is not present, the sync Threshold element is not present, and wherein if the synchronized element is set to true, the check Interval element is not present.

15. The method of claim 14, wherein the constraint is a SRMPing element.

16. A terminal having a memory card attached thereto, the terminal configured to use rights corresponding to broadcast contents and comprising:

a controller configured to:

check whether or not rights corresponding to broadcast contents include a constraint for verifying an existence of the memory card and an existence of the rights within the memory card, and if the rights includes the constraint, perform a procedure for verifying the existence of the memory card and the existence of the rights within the memory card, the procedure for verifying including:

transmitting to the memory card, a request message for verifying an existence of the memory card and an existence of the rights within the memory card, receiving a response message from the memory card, and continuing/initiating or stopping/not initiating a consumption of the rights according to whether the response message is valid or not, wherein the constraint comprises at least one of:

a synchronized element indicating that the verification of the existence of the rights should be performed in synchronization with a traffic encryption key (TEK) request, a sync Threshold element indicating that the verification of the existence of the rights should be performed when a reception of the TEK request exceeds a predetermined threshold value, and a check Interval element indicating that the verification of the existence of the rights should be repeatedly performed for a predetermined duration, wherein if the synchronized element is not present, the sync Threshold element is not present, and wherein if the synchronized element is set to true, the check Interval element is not present.

\* \* \* \* \*